US010895455B2

(12) United States Patent
Shi et al.

(10) Patent No.: US 10,895,455 B2
(45) Date of Patent: Jan. 19, 2021

(54) METHODS AND RANGING APPARATUS FOR POSITIONING TARGET OBJECT IN TARGET SPACE

(71) Applicant: NORTHWEST INSTRUMENT INC., Budd Lake, NJ (US)

(72) Inventors: Xin Shi, Shanghai (CN); David Xing, Shanghai (CN); Weichen Wang, Shanghai (CN)

(73) Assignee: NORTHWEST INSTRUMENT INC., Budd Lake, NJ (US)

( * ) Notice: Subject to any disclaimer, the term of this patent is extended or adjusted under 35 U.S.C. 154(b) by 917 days.

(21) Appl. No.: 15/355,700

(22) Filed: Nov. 18, 2016

(65) Prior Publication Data

US 2017/0336201 A1    Nov. 23, 2017

(30) Foreign Application Priority Data

May 20, 2016    (CN) .......................... 2016 1 0340604

(51) Int. Cl.
*G01C 3/08*    (2006.01)
*G01C 3/02*    (2006.01)
(Continued)

(52) U.S. Cl.
CPC .............. *G01C 3/02* (2013.01); *G01S 7/4802* (2013.01); *G01S 17/42* (2013.01)

(58) Field of Classification Search
CPC .......... G01C 3/02; G01S 7/4802; G01S 17/42
See application file for complete search history.

(56) References Cited

U.S. PATENT DOCUMENTS

2012/0087212 A1    4/2012  Vartanian et al.
2014/0284378 A1*   9/2014  Bonneau, Jr. ...... G06K 7/10118
                                                    235/375
(Continued)

FOREIGN PATENT DOCUMENTS

CN          102186183 A     9/2011
CN          104508425 A     4/2015
(Continued)

OTHER PUBLICATIONS

Phan, Viet Toan, et al. "Interior Design in Augmented Reality Environment." International Journal of Computer Applications (0975-8887, vol. 5—No. 5, Aug. 2010. https://pdfs.semanticscholar.org/6f33/5173a4608f4e3c38837f8d0c7ed7d0b52208.pdf?_ga=2.234001174.905506487.1573571363-664004985.1573571363 (Year: 2010).*

(Continued)

*Primary Examiner* — Samantha K Abraham
(74) *Attorney, Agent, or Firm* — Anova Law Group, PLLC

(57) ABSTRACT

The present invention relates to a method of positioning a target object in a target space by means of a ranging apparatus, the method comprises: acquiring a first size parameter of the target space on a first dimension; acquiring a second size parameter of the target object on the first dimension; and determining a first layout indication according to the first size parameter, the second size parameter and a first predetermined rule, the first layout indication containing information regarding a first target position of the target object on the first dimension of the target space. By means of the method in accordance with the invention, a desired positioning of the target object in the target space by means of a ranging apparatus may be implemented, such as being placed at the center or being placed at a one-third (Continued)

aliquot point, thus implementing the object placement and layout in the object space.

16 Claims, 4 Drawing Sheets

(51) Int. Cl.
    *G01S 17/42*           (2006.01)
    *G01S 7/48*            (2006.01)

(56) References Cited

U.S. PATENT DOCUMENTS

2015/0204976 A1     7/2015    Bösch
2016/0104285 A1*   4/2016    Pettegrew ................ G06T 5/50
                                                                   348/36

FOREIGN PATENT DOCUMENTS

CN         104569916 A     4/2015
CN         204854688 U    12/2015
JP          11-248451 A     9/1999

OTHER PUBLICATIONS

International Search Report for Application No. PCT/CN2017/084863, dated Aug. 18, 2017.

\* cited by examiner

METHODS AND RANGING APPARATUS FOR POSITIONING TARGET OBJECT IN TARGET SPACE

TECHNICAL FIELD

The present invention relates to the field of surveying and mapping, and more particularly, to a method for positioning a target object in a target space by means of a ranging apparatus, a method for searching a positioning point in a target space by means of a ranging apparatus, as well as a ranging apparatus for positioning a target object by using the above methods.

BACKGROUND

Rangefinder is a widely popular portable device with high acceptance for measuring spatial distance. However, existing rangefinders are only used to measure the linear distance to some reflection plane, but not able to implement the spatial layout of the target object. Whereas implementing the spatial layout of the target object inevitably needs to implement both measuring the spatial distance as well as positioning a target position of that target object in the corresponding space.

A ranging and positioning system is disclosed in PCT Application No. WO2014/124785, in which a ranging and positioning system comprising transmitter and receiver nodes is disclosed. In this patent application, the ranging and positioning system has a ranging mode, in which ranging exchange of signals takes place between a master device and a slave device, i.e., measuring distance in this patent application is implemented through evaluation of signals between a master device and a slave device.

Further, patent application CN 1004121885A discloses a positioning rangefinder. This positioning rangefinder has rotatable red laser positioning rod I, red laser positioning rod II as well as linear angular displacement sensor I, angular displacement sensor II. This patent application performs positioning through laser lamp and measures the angle by utilizing angular displacement, and then calculates the distance between two points to be measured based on the axial distance of the two angular displacements. That is, the positioning principle is implemented by employing angular displacement sensor and laser lamp.

It can be known from the description of above patent applications that, ranging and positioning methods in prior art are implemented either by complicated analysis of the signal between a master device and a slave device, or implemented through a positioning rangefinder with complex structures containing laser positioning rod and angular displacement sensor. The above two manners are both costly and the operations are too complex to implement.

SUMMARY

In respect to the above technical problems, i.e., existing devices for implementing ranging and positioning method having complex structures and the entire ranging and positioning process not easy to implement, it would be desirable if a ranging and positioning method with simple structure and convenient operation may be proposed.

To resolve the above-mentioned technical problems in prior art, a first aspect of the invention proposes a method for positioning a target object in a target space by means of a ranging apparatus, the method comprises:

acquiring a first size parameter of the target space on a first dimension;

acquiring a second size parameter of the target object on the first dimension;

determining a first layout indication according to the first size parameter, the second size parameter and a first predetermined rule, the first layout indication containing information regarding a first target position of the target object on the first dimension of the target space.

Those skilled in the art should understand that, the specific implementations of acquiring the first size parameter and the second parameter by means of the ranging apparatus here take a variety of forms, including but not limited to: the ranging apparatus utilizing its own characteristic of being able to measuring distance to measure the first size parameter of the target space on a first dimension and/or the second size parameter of the target object on the first dimension; of course also including the ranging apparatus receiving the first size parameter of the target space on the first dimension and/or the second size parameter of the target object on the first dimension input by a user through a human machine interface HMI contained by itself. So long as an approach is capable of acquiring the first size parameter of the target space on the first dimension and/or the second size parameter of the target object on the first dimension, it falls into the scope of the invention.

Further, the first size parameter and the second size parameter include but not limited to length data, height data and/or angle data; the target object may be regular object such as a cuboid of a square table, and may also be circular or other irregular shapes; accordingly, the target space may be for example a regular square room, but may also be irregularly shaped room such as circular or oval.

In one preferred implementation of the invention, the first predetermined rule is stored in a memory of the ranging apparatus or received by the ranging apparatus through its communication module.

Here, the first predetermined rule may be predetermined in the ranging apparatus and stored in the memory of the ranging apparatus. Such an implementation may implement the reading of the first predetermined rule independently without the aid of cooperation from other external devices, making it relatively easy to use; of course, the first predetermined rule may also be received by the ranging apparatus through its communication module. Such an implementation enables the ranging apparatus to be dynamically configured, thus making the positioning of the target object in the target space more flexible.

In one preferred implementation of the invention, the method further comprises:

the ranging apparatus outputting a prompt signal according to the first layout indication when the target object is at the first target position on the first dimension of the target space.

In this way, the ranging apparatus may remind the user of the completion of positioning when the target object is at the first target position, thereby simplifying the user's operation, implementing the positioning of the target object in the target space easily.

In one preferred implementation of the invention, the ranging apparatus outputting the prompt signal includes:

the ranging apparatus outputting an optical prompt through a display apparatus;

the ranging apparatus outputting an acoustic prompt through a speaker; and/or the ranging apparatus outputting the prompt signal to a prompt device connected to the ranging apparatus.

In one preferred implementation of the invention, the first predetermined rule includes arranging the target object at an aliquot point of the target space on the first dimension.

In one preferred implementation of the invention, arranging the target object at the aliquot point of the target space on the first dimension includes at least one of:

arranging the target object at the center of the target space on the first dimension; or arranging the target object at a m/n aliquot point of the target space, wherein n is a natural number greater than or equal to three, m is a natural number greater than or equal to one, m is smaller than n and m is not equal to n/2.

In one preferred implementation of the invention, the method further includes:

acquiring a third size parameter of the target space on a second dimension;

acquiring a fourth size parameter of the target object on the second dimension;

determining a second layout indication according to the third size parameter, the fourth size parameter and a second predetermined rule, the second layout indication containing information regarding a second target position of the target object on the second dimension of the target space.

In one preferred implementation of the invention, the first dimension and the second dimension are perpendicular to each other.

In this way, the method may implement arranging the target object at a predetermined position in a two-dimensional plane.

In one preferred implementation of the invention, the method further comprises:

acquiring a fifth size parameter of the target space on a third dimension;

acquiring a sixth size parameter of the target object on the third dimension;

determining a third layout indication according to the fifth size parameter, the sixth size parameter and a third predetermined rule, the third layout indication containing information regarding a third target position of the target object on the third dimension of the target space.

In one preferred implementation of the invention, the first dimension, the second dimension and the third dimension are perpendicular to each other.

In this way, the method may implement arranging the target object at a predetermined position in a three-dimensional space.

Further, a second aspect of the invention proposes a method of searching a positioning point in a target space by means of a ranging apparatus, the method comprising:

the ranging apparatus receiving a predetermined rule which indicates a relative position between the positioning point and a reference point; and the ranging apparatus searching the positioning point according to the predetermined rule and outputting a prompt signal.

In this way, the positioning point may be searched in the target space by means of the ranging apparatus, thereby providing a basis for the positioning of subsequent target object.

In one preferred implementation of the invention, the predetermined rule includes arranging a target object at an aliquot point of the target space on the first dimension.

In one preferred implementation of the invention, arranging the target object at the aliquot point of the target space on the first dimension includes at least one of the following:

arranging the target object at the center of the target space on the first dimension; or arranging the target object at a m/n aliquot point of the target space on the first dimension, wherein n is a natural number greater than or equal to three, m is a natural number greater than or equal to one, m is smaller than n and m is not equal to n/2.

In one preferred implementation of the invention, the predetermined rule is stored in a memory of the ranging apparatus or received by the ranging apparatus through its communication module.

Finally, a third aspect of the invention proposes a ranging apparatus for positioning a target object in a target space, which is characterized by that, the ranging apparatus comprising:

a size parameter acquisition module which is constructed for acquiring a first size parameter of the target space on a first dimension and a second size parameter of the target object on the first dimension;

an analysis module which is constructed for determining a first layout indication according to the first size parameter, the second size parameter and a first predetermined rule, the first layout indication containing information regarding a first target position of the target object on the first dimension of the target space.

A ranging apparatus proposed in accordance with the invention may implement measurements on the sizes of the target space and the target object, and may also implement calculation of the target position based on the first size parameter, the second size parameter and the first predetermined rule, thus providing basis for conveniently placing the target object at the target position of the target space.

In one preferred implementation of the invention, the ranging apparatus further comprises:

a prompt module which is constructed for outputting a prompt signal according to the first layout indication when the target object is at the first target position on the first dimension of the target space.

In one preferred implementation of the invention, the prompt signal comprising an optical prompt output through a display apparatus, an acoustic sound output through a speaker and/or an alert signal output to a prompt device connected to the ranging apparatus through a data interface.

In one preferred implementation of the invention, the ranging apparatus further comprises:

a storage module which is constructed for storing the first predetermined rule; and/or a communication module which is constructed for receiving the first predetermined rule.

In one preferred implementation of the invention, the first predetermined rule includes arranging the target object at an aliquot point of the target space on the first dimension.

In one preferred implementation of the invention, arranging the target object at the aliquot point of the target space on the first dimension includes at least one of the following:

arranging the target object at the center of the target space on the first dimension; or arranging the target object at a m/n aliquot point of the target space on the first dimension, wherein n is a natural number greater than or equal to three, m is a natural number greater than or equal to one, m is smaller than n and m is not equal to n/2.

In one preferred implementation of the invention, the size parameter acquisition module comprising:

a rangefinder which is constructed for acquiring a first size parameter of the target space on a first dimension; and a ranging wheel which is constructed for acquiring a second size parameter of the target object on the first dimension.

In this way, the ranging apparatus not only contains the rangefinder in order to acquire a first size parameter of the target space on a first dimension, but also contains the ranging wheel for easy acquisition of a second size parameter of the target object on the first dimension, thus enabling further simplify the placement of subsequent target object in the target space.

In one preferred implementation of the invention, the rangefinder is also constructed for acquiring a third size parameter of the target space on a second dimension and/or a fourth size parameter of the target space on a third dimension.

In this way, the ranging apparatus may implement arranging the target object at a predetermined position in a two-dimensional plane.

In one preferred implementation of the invention, the first dimension, the second dimension and/or the third dimension are perpendicular to each other.

In this way, the ranging apparatus may implement arranging the target object at a predetermined position in a three-dimensional space.

In one preferred implementation of the invention, the first dimension includes a linear direction and an arc direction, and the first size parameter and the second size parameter include a linear distance and an angle.

In summary, by means of the methods proposed in accordance with the invention, desired positioning of a target object in a target space may be implemented by means of a ranging apparatus (such as being arranged at the center or arranged at one-third aliquot point), thus implementing the object placement and layout in target space.

BRIEF DESCRIPTION OF THE DRAWINGS

Embodiments are illustrated and set forth with reference to the accompanying figures. These figures are for purpose of clarifying basic principles, thus only illustrating the aspects necessary for understanding the basic principles. These figures are not drawn to scale. The same reference labels have been repeated among the figures to indicate analogous features.

Other characteristics, features, advantages and benefits of the invention will be more apparent from the detailed description below in connection with the accompanying figures.

DETAILED DESCRIPTION

In the following detailed description of preferred embodiments, reference will be made to the accompanying figures which constitute a part of the invention. The accompanying figures illustrate specific embodiments capable of implementing the invention by way of example. The exemplary embodiments are not intended to exhaust all embodiments in accordance with the invention. It can be understood that other embodiments may be utilized or structural or logical modifications may be made without departing the scope of the invention. Therefore, the following detailed description is not limiting and the scope of the invention is defined by the appended claims.

Figure 1:
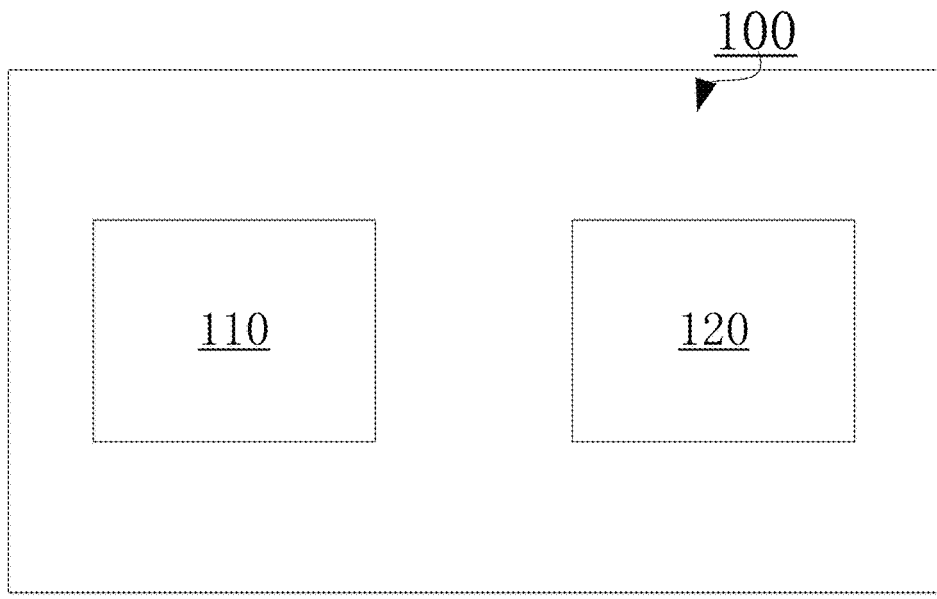
FIG. 1 illustrates a block schematic diagram 100 of a ranging apparatus proposed in accordance with the invention.

FIG. 1 illustrates a block schematic diagram 100 of a ranging apparatus proposed in accordance with the invention. It can be seen in the figure that, the ranging apparatus 100 includes a size parameter acquisition module 110, which is constructed for acquiring a first size parameter of a target space on a first dimension and a second size parameter of a target object on the first dimension. Moreover, the ranging apparatus 100 also includes an analysis module 120, which is constructed for determining a first layout indication according to the first size parameter, the second size parameter and a first predetermined rule, the first layout indication containing information regarding a first target position of the target object on the first dimension of the target space.

Here, those skilled in the art should understand that, the first size parameter and the second size parameter include but not limited to length data, height data and/or angle data; the target object may be regular object such as cuboid of a square table, and may also be for instance circular or other irregular shapes; accordingly, the target space may be for example a square room, and also may be irregularly shaped room such as circular or oval.

The ranging apparatus proposed in accordance with the invention may implement measurements on the sizes of the target space and the target object, and may also implement calculation of the target position according to the first size parameter, the second size parameter and a first predetermined rule, thus providing a basis for placing the target object at the target position of the target space.

Furthermore, the ranging apparatus 100 in accordance with the invention may further include a prompt module (not shown in the figure), which is constructed for outputting a prompt signal according to the first layout indication when the target object is at the first target position on the first dimension of the target space. For example, when the first layout indication obtained by the analysis module 120 of the ranging apparatus 100 indicates arranging one side of the object at 1 meter from the wall surface, the ranging apparatus will output an alert signal, when it recognizes that this side of the object is at 1 meter from the wall surface, to indicate that this object have been at the first target position.

Nevertheless there are various ways on how to output the prompt signal, such as an optical prompt output through a display apparatus, an acoustic prompt output through a speaker and/or an alert signal output through a data interface to a prompt device connected to the ranging apparatus. That is to say, for example when the first layout indication obtained by the analysis module 120 of the ranging apparatus 100 indicates arranging one side of the object at 1 meter from the wall surface, when the ranging apparatus recognizes this side of the subject is at 1 meter from the wall surface, it may generate a sound through, for example, a buzzer equipped by the ranging apparatus itself, and may also output an optical signal through a display or cue light equipped by the ranging apparatus itself. Of course, the ranging apparatus may also output this prompt signal through a communication interface (such as through Bluetooth interface or Wi-Fi interface) to a portable handheld device such as cell phone, to better output the prompt signal.

In this invention, the mentioned ranging apparatus also includes a storage module which is constructed for storing a first predetermined rule; and/or the ranging apparatus can include a communication module which is constructed for receiving the first predetermined rule. The first predetermined rule here may be for example arranging a target object at an aliquot point of a target space on a first dimension. Here the aliquot points may have various expression forms, such as arranging the target object at the center of a target space on a first dimension; or arranging the target object at ⅓, ⅔, ¼, ¾, ⅕, ⅖ aliquot points of the target space on the first dimension. As described above, the said aliquot point here is not limited to the length aliquot point or height aliquot point, and may also be other forms of aliquot point, such as angle aliquot point, and so on.

In one preferred implementation of the invention, the size parameter acquisition module 120 may include a rangefinder, wherein the rangefinder is constructed for acquiring a first size parameter of the target space on a first dimension; and may also include a ranging wheel, which is constructed for acquiring a second size parameter of the target object on the first dimension. Here, the ranging apparatus integrates the rangefinder and the ranging wheel together to enable acquiring the spatial distance and object length in a more convenient way. For instance, when a table is needed to be arranged in a room, the ranging apparatus may acquire the length, width and height of the room conveniently by means of the included rangefinder, and may also acquire the length, width and height data of the table conveniently by means of the included ranging wheel, thereby enabling further simplifying the placement of subsequent target object in the target space.

In one preferred implementation of the invention, the rangefinder is also constructed for acquiring a third size parameter of the target space on a second dimension and/or a fourth parameter of the target space on a third dimension. In this way, the ranging apparatus may implement arranging the target object at a predetermined position in a two-dimensional plane or a three-dimensional space, wherein the first dimension, the second dimension and/or the third dimension are perpendicular to each other.

In summary, a desired positioning of a target object in a target space may be implemented by means of the ranging apparatus proposed in accordance with the invention, such as being arranged at the center or being arranged at a one-third aliquot point, thus implementing object placement and layout in the target space.

Figure 2:
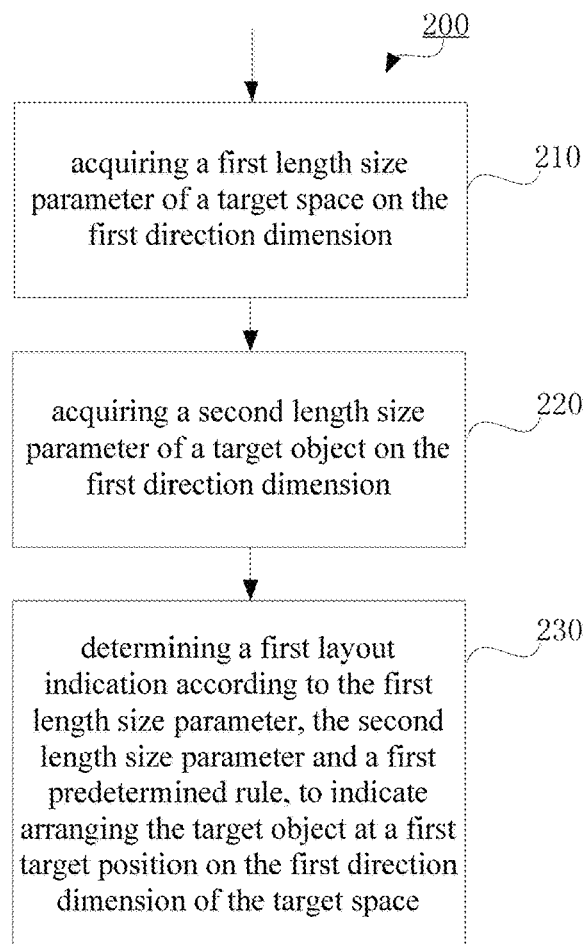
FIG. 2 illustrates a flow schematic diagram 200 of a method of positioning a target object in a target space by means of a ranging apparatus proposed in accordance with the invention.

FIG. 2 illustrates a flow schematic diagram 200 of a method of positioning a target object in a target space by means of a ranging apparatus proposed in accordance with the invention. It can be seen in the figure that the method includes the following steps:

First, in the first step 210, acquiring a first size parameter of the target space on a first dimension;

Then, next in the second step 220, acquiring a second size parameter of the target object on the first dimension;

Finally, in the third step 230, determining a first layout indication according to the first size parameter, the second size parameter and a first predetermined rule, the first layout indication containing information regarding a first target position of the target object on the first dimension of the target space.

Here, the first predetermined rule may be stored in a memory of the ranging apparatus, and may also be received by the ranging apparatus from outside through its communication module. That is to say, this first predetermined rule may be predetermined in the ranging apparatus and be stored in the memory of the ranging apparatus. Such an implementation may implement reading of the first predetermined rule independently without the aid of cooperation of other external device, making it relatively convenient to use; of course, such a first predetermined rule may also be received by the ranging apparatus through its communication module, such an implementation enables the ranging apparatus to be configured dynamically, thereby making the positioning of the target object in the target space more flexible.

In one preferred embodiment of the invention, the method further comprises: the ranging apparatus outputs a prompt signal according to the first layout indication when the target object is at the first target position on the first dimension of the target space.

Figure 3:
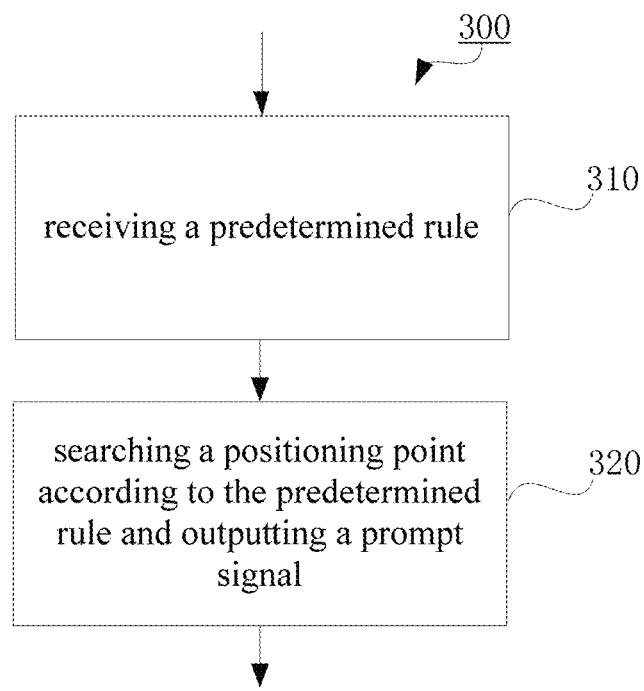
FIG. 3 illustrates a flow schematic diagram 300 of a method of searching a positioning point in a target space by means of a ranging apparatus proposed in accordance with the invention.

FIG. 3 illustrates a process schematic diagram 300 of a method of searching a positioning point in a target space by means of a ranging apparatus proposed in accordance with the invention. It can be seen from the figure that, the method of searching the positioning point in the target space by means of the ranging apparatus includes the following steps:

First, in step 310, the ranging apparatus receives a predetermined rule which indicates a relative position between the positioning point and a reference point; and Next, in step 320, the ranging apparatus searches the positioning point according to the received predetermined rule and outputs a prompt signal.

As an example, for instance, a user desires to open a 2 meter wide window in the center of a 4 meter wide wall. Then the predetermined rule may be, for example, finding out two positioning points at 1 meter and 3 meter from the wall corner. Here, whether the ranging apparatus is arranged at the reference points or arranged at the positioning points to be found, as long as the above predetermined rule is met, the ranging apparatus will output the prompt signal, whose output manner has been described above and will not be described further.

Next, the first to the fourth embodiments of implementing the positioning of a target object in a target space by means of the above ranging apparatus and positioning method will be described by means of FIG. 4 to FIG. 7.

Figure 4:
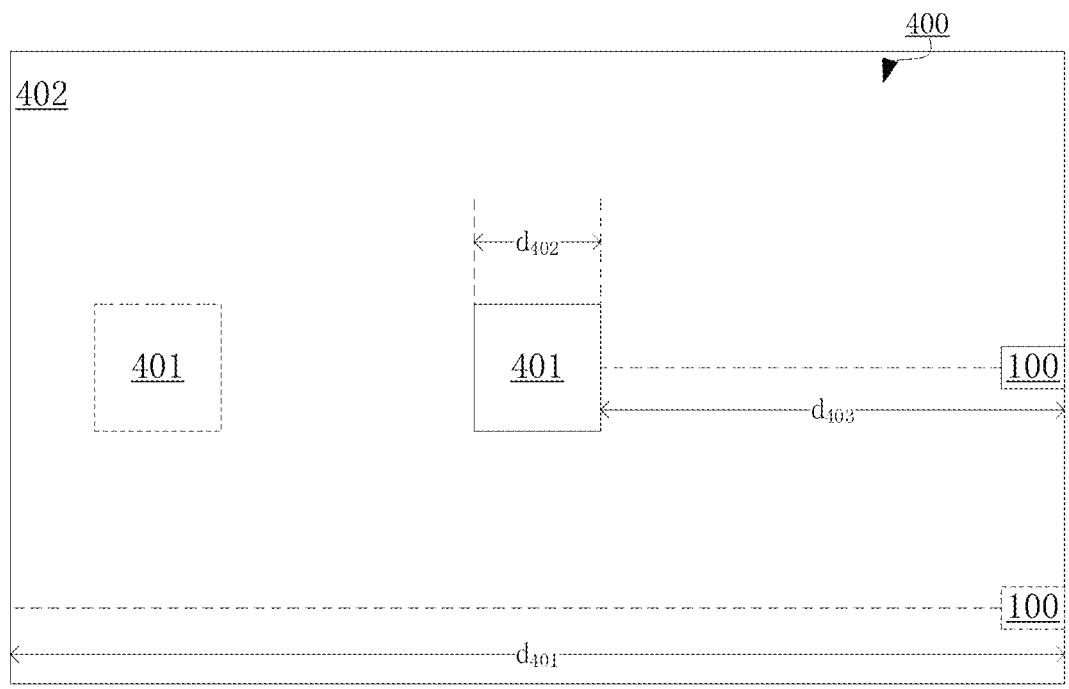
FIG. 4 illustrates a process schematic diagram 400 of a first embodiment of implementing the positioning of a target object in a target space by means of the above ranging apparatus and positioning method.

FIG. 4 illustrates a process schematic diagram 400 of a first embodiment of implementing the positioning of a target object in a target space by means of the above ranging apparatus and positioning method. It can be seen from the figure that, to arrange object 401 at the illustrated lateral center of space 402, first it is required to measure the illustrated lateral distance d401 of the space 402 by means of the ranging apparatus 100. Then, it is required to measure the illustrated lateral distance d402 of the object 401 to be placed by means of the ranging apparatus 100. Those skilled in the art should understand that, here the distance d401 and d402 both have included the size of the ranging apparatus itself. Since the target is to arrange the object 401 at the illustrated lateral center of the space 402, so long as the distance d403 between the object 401 and the illustrated lateral side of the space 402 is (d401−d402)/2, the requirement can be met. Here, the ranging apparatus 100 may be put against the wall to determine whether the distance of the ranging apparatus 100 from the object 401 meet the requirement; the ranging apparatus 100 may also be placed at the side of the object 401 which is closer to the wall, making the ranging apparatus 100 move with the object 401 from the dashed line position to the solid line position, to determine whether the distance of the ranging apparatus 100 from the object 401 meet the requirement. Where the measured distance meets the requirement, a prompt signal may be output by the ranging apparatus. Here, the output manner of the prompt signal is consistent with the previous described output manner, i.e., a sound may be generated for example through a buzzer equipped by the ranging apparatus itself, and an optical signal may also be output through a display or cue light equipped by the ranging apparatus itself, and of course the prompt signal may also be output to a portable handheld device such as cell phone through a communication interface of the ranging apparatus (such as through Bluetooth interface or Wi-Fi interface), to better output the prompt signal.

Here, although the illustrated space 402 is regularly shaped and object 401 is regularly shaped as well, the concept of the invention (i.e., the spirit of the invention) is not limited to object with regular shape and space with regular shape. That is, even though the shapes of object 401 and/or space 402 are irregular, the layout of object 401 in space 402 may also be implemented in accordance with the concept of the invention.

Figure 5:
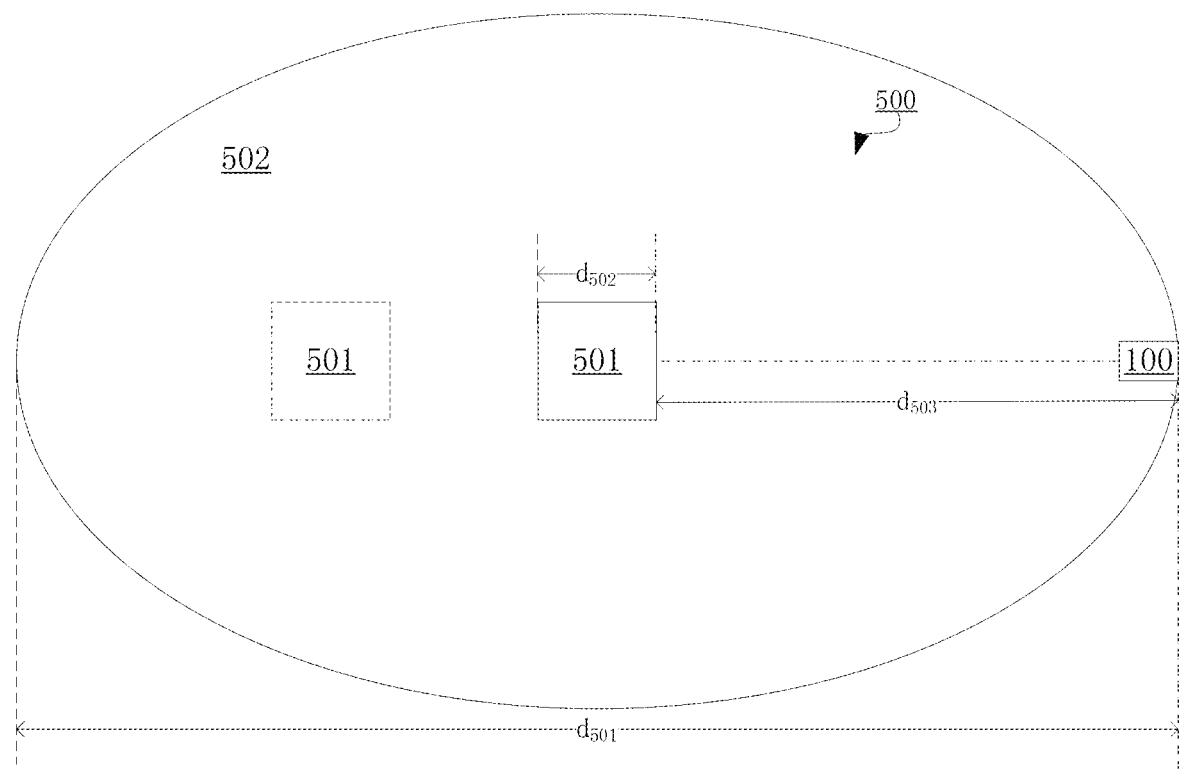
FIG. 5 illustrates a process schematic diagram 500 of a second embodiment of implementing the positioning of a target object in a target space by means of the above ranging apparatus and positioning method.

The following will describe how to arrange an object when the space to be arranged in is not such a regular shape by means of FIG. 5. FIG. 5 illustrates a process schematic diagram 500 of a second embodiment of implementing the positioning of a target object in a target space by means of the above ranging apparatus and positioning method.

It can be seen from FIG. 5 that, the target space is for example oval. Here the positioning method has no much difference than the previous ones. The detailed process is as follows: to arrange object 501 at the illustrated lateral center of space 502, first it is required to measure the illustrated lateral distance d501 of the space 502 by means of the ranging apparatus 100; then, it is required to measure the illustrated lateral distance d502 of the object 501 to be placed by means of the ranging apparatus 100. Those skilled in the art should understand that, here the distance d501 and d502 both have included the size of the ranging apparatus itself. Since the target is to arrange the object 501 at the illustrated lateral center of the space 502, so long as the distance d503 between the object 501 and the illustrated lateral side of the space 502 is (d501−d502)/2, the requirement can be met. Here, the ranging apparatus 100 may be put against the wall to determine whether the distance of the ranging apparatus 100 from the object 501 meet the requirement; and the ranging apparatus 100 may also be placed at the side of the object 501 which is closer to the wall, making the ranging apparatus 100 move with the objet 501 from the dashed line position to the solid line position, to determine whether the distance of the ranging apparatus 100 from the object 501 meet the requirement. Where the measured distance meets the requirement, a prompt signal may be output by the ranging apparatus. Here, the output manner of the prompt signal is consistent with the previous described output manner, i.e., a sound may be generated for example through a buzzer equipped by the ranging apparatus itself, and an optical signal may also be output through a display or cue light equipped by the ranging apparatus itself, of course the prompt signal may also be output to a portable handheld device such as cellphone through a communication module of the ranging apparatus (such as through Bluetooth interface or Wi-Fi interface), to better output the prompt signal.

Those skilled in the art should understand that, the sizes of the above space 502 and object 501 may be obtained through measurements by the ranging apparatus, and may be input through a human machine interface HMI of the ranging apparatus. For example, a layout diagram of the space to be placed, the object to be placed and the placing requirement may be received directly through the communication interface of the ranging apparatus 100, thus outputting the prompt signal according to the layout diagram.

Moreover, by means of the ranging apparatus 100 in accordance with the invention, not only may an object be placed on one dimension in accordance with the requirement, but the object may also be placed on two and three or more dimensions in accordance with the requirement. The following will describe how to meet the placing requirement on a two-dimensional plane by means of the ranging apparatus 100 in accordance with the invention. In fact, the placing requirement in a three-dimensional space may also be implemented in accordance with the spirit of the invention.

Figure 6:
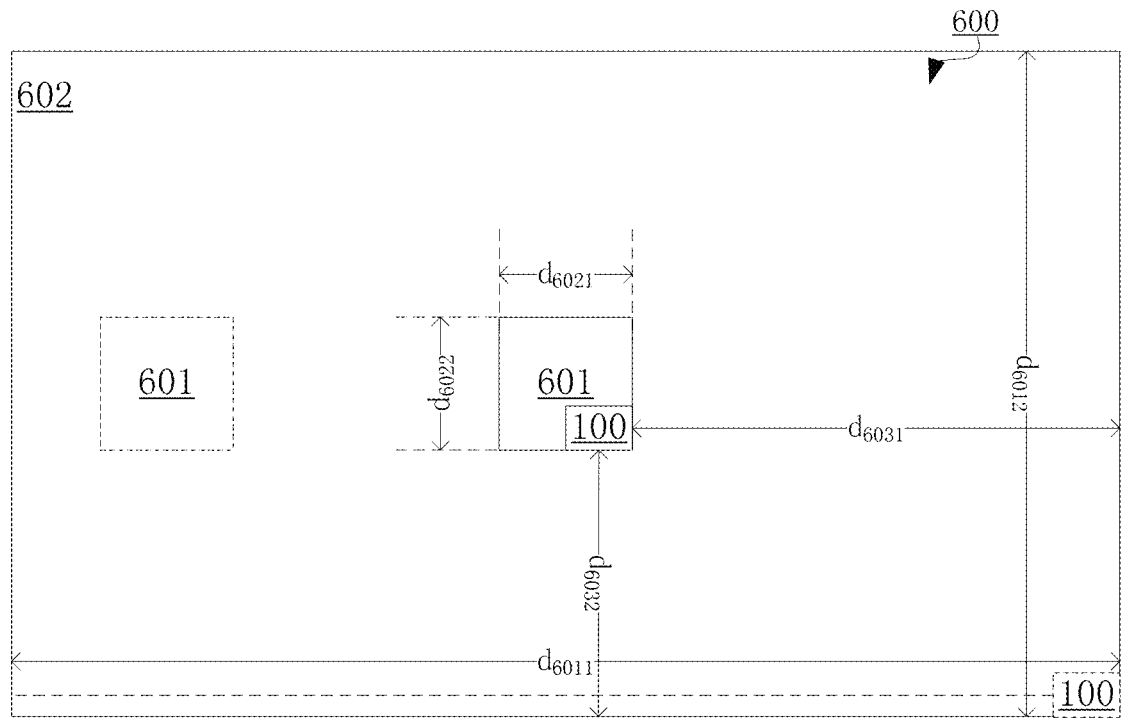
FIG. 6 illustrates a process schematic diagram 600 of a third embodiment of implementing the positioning of a target object in a target space by means of the above ranging apparatus and positioning method.

FIG. 6 illustrates a process schematic diagram 600 of a third embodiment of implementing the positioning of a target object in a target space by means of the above ranging apparatus and positioning method.

It can be seen from FIG. 6 that, the target is for example rectangular. Here the positioning method has no much difference than the previous ones. The detailed process is as follows: to arrange object 601 at the illustrated lateral center of space 602, first it is required to measure the illustrated lateral distance d6011 and the illustrated longitudinal distance d6012 of the space 602 by means of the ranging apparatus 100. Those skilled in the art should understand that, here the distance d6011 and d6012 both have included the size of the ranging apparatus itself. Then, it is required to measure the illustrated lateral distance d6021 and the illustrated longitudinal distance d6022 of the object 501 to be placed by means of the ranging apparatus 100. Since the target is to arrange the object 601 at the illustrated lateral center of the space 602, so long as the distance d6031 between the object 601 and the illustrated lateral side of the space 602 is made to (d6011−d6021)/2 and the distance d6032 between the object 601 and the illustrated longitudinal side of the space 602 is made to (d6012−d6022)/2, the requirement can be met. Here, the ranging apparatus 100 may be put against the wall to determine whether the distance of the ranging apparatus 100 from the object 601 meet the requirement; the ranging apparatus 100 may also be placed at the side of the object 601 which is closer to the wall, making the ranging apparatus 100 move with the object 601 from the dashed line position to the solid line position, to determine whether the distance of the ranging apparatus 100 from the object 601 meet the requirement. Where the measured distance meets the requirement, a prompt signal may be output by the ranging apparatus. Here the output manner of the prompt signal is consistent with the previous described manner, i.e., a sound may be generated for example through a buzzer equipped by the ranging apparatus itself, and an optical signal may also be output through a display or cue light equipped by the ranging apparatus itself, and of course the prompt signal may also be output to a portable handheld device such as cellphone through a communication interface of the ranging apparatus (such as through Bluetooth interface or Wi-Fi interface), to better output the prompt signal.

Although the illustrated space 602 is regularly shaped and the object 601 is regularly shaped as well, the concept of the invention (i.e., the spirit of the invention) is not limited to object with regular shape and space with regular shape. That is, even though the shapes of the object 601 and/or the space 602 are irregular, the layout of the object 601 in the space 602 may also be implemented in accordance with the concept of the invention. Moreover, those skilled in the art should understand that, the sizes of the above space 602 and object 601 may be obtained through the measurements by the ranging apparatus, and may also be input through a human machine interface HMI of the ranging apparatus. For example, the layout diagram of the space to be placed, the object to be placed and the placing requirement may be received directly through a communication interface of the ranging apparatus 100, thus outputting the prompt signal according to the layout diagram.

In addition, the acquisition of the size parameters of two dimensions may be acquired through two measurements by a single dimension ranging apparatus, and may also be implemented at one time by a ranging apparatus with a ranging unit on two dimensions.

Further, according to the principle illustrated in FIG. 6, height requirement may also be added into the predetermined rule, thus realizing a three-dimensional positioning.

Figure 7:
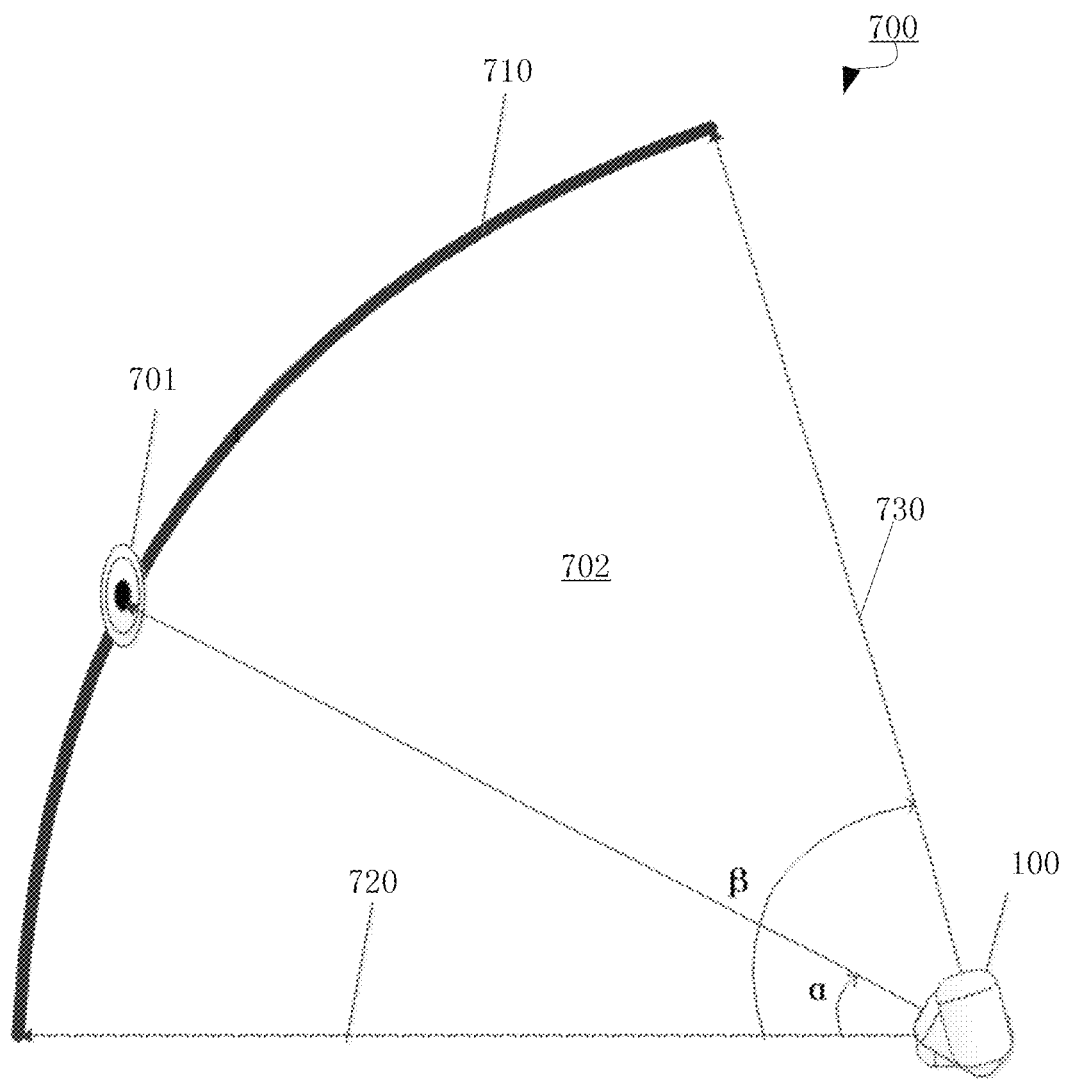
FIG. 7 illustrates a process schematic diagram 700 of a fourth embodiment of implementing the positioning of a target object in a target space by means of the above ranging apparatus and positioning method.

FIG. 4 to FIG. 6 illustrates spatial positioning on the dimension of length. Moreover, the positioning on the dimension of arc may also be implemented according to the ranging apparatus of the invention and the corresponding method. FIG. 7 illustrates a process schematic diagram 700 of a fourth embodiment of implementing the positioning of a target object in a target space by means of the above ranging apparatus and positioning method.

It can be seen from the figure that, when it is required to place object 701 on arc 710 between line 720 and line 730 of the space 702, first it is required to obtain for example the length of arc 710 or the angle β between line 720 and line 730. Then for example trisect or place the object 701 at the arc 710 with a angle to line 720 according to the requirement of the received or stored predetermined rule, here a prompt signal may be output by the ranging apparatus, to place the object 701 at the required position. Such an application is very suitable for the placement of tables and seats in performance venue such as a theatre.

In the above embodiments, the sizes measured by the ranging apparatus all have included the size of the ranging apparatus itself.

Those skilled in the art should understand that, various variations and modifications may be made to the various embodiments disclosed above without departing from the nature of the invention. Thus, the scope of the invention should be defined by the appended claims.

Although different exemplary embodiments have been described, it would be apparent to those skilled in the art that, different changes and modifications may be made which may implement some of the advantages of the invention without departing the spirit and scope of the invention. For those skilled in the art, other components performing the same function may be properly substituted. It should be noted that, here the features explained with reference to specific figures may be combined with the features of other figures, even if in cases where it is not explicitly mentioned. Further, methods of the invention may be implemented in all software implementations using proper processor instructions or in mixed implementations which obtain the same result utilizing the combination of hardware logics and software logics. Such modifications to the scheme in accordance with the invention are intended to be covered by the appended claims.

What is claimed is:

1. A method of positioning a target object in a target space by means of a ranging apparatus, the method comprising:
   acquiring, by the ranging apparatus, a first size parameter of the target space on a first dimension;
   acquiring, by the ranging apparatus, a second size parameter of the target object on the first dimension;
   determining a first layout indication according to the first size parameter, the second size parameter and a first predetermined rule, the first layout indication containing information regarding a first target position of the target object on the first dimension of the target space;
   determining, by the ranging apparatus, whether the target object is at the first target position in the target space; and
   outputting, by the ranging apparatus, a prompt signal according to the first layout indication when the ranging apparatus determines that the target object is at the first target position in the target space.

2. The method of claim 1, wherein the first predetermined rule is stored in a memory of the ranging apparatus or received by the ranging apparatus through its communication module.

3. The method of claim 1, wherein the method also comprising:
   the ranging apparatus outputting a prompt signal according to the first layout indication when the target object is at the first target position on the first dimension of the target space.

4. The method of claim 3, wherein the ranking apparatus outputting the prompt signal includes:
   the ranging apparatus outputting an optical prompt through a display apparatus;
   the ranging apparatus outputting an acoustic prompt through a speaker; and/or
   the ranging apparatus outputting the prompt signal to a prompt device connected to the ranging apparatus.

5. The method of claim 1, wherein the first predetermined rule includes arranging the target object at an aliquot point of the target space on the first dimension.

6. The method of claim 5, wherein arranging the target object at the aliquot point of the target space on the first dimension including at least one of:
   arranging the target object at the center of the target space on the first dimension; or
   arranging the target object at a m/n aliquot point of the target space on the first dimension, wherein n is a natural number greater than or equal to three, m is a natural number greater than or equal to one, m is smaller than n and m is not equal to n/2.

7. The method of claim 1, the method also comprising:
   acquiring a third size parameter of the target space on a second dimension;
   acquiring a fourth size parameter of the target object on the second dimension;
   determining a second layout indication according to the third size parameter, the fourth size parameter and a second predetermined rule, the second layout indication containing information regarding a second target position of the target object on the second dimension of the target space.

8. The method of claim 7, wherein the first dimension and the second dimension are perpendicular to each other.

9. The method of claim 1, the method also comprising:
acquiring a fifth size parameter of the target space on a third dimension;
acquiring a sixth size parameter of the target object on the third dimension;
determining a third layout indication according to the fifth size parameter, the sixth size parameter and a third predetermined rule, the third layout indication containing information regarding a third target position of the target object on the third dimension of the target space.

10. The method of claim 9, wherein the first dimension, the second dimension and the third dimension are perpendicular to each other.

11. The method of claim 1, wherein the first dimension includes a linear direction and an arc direction, and the first size parameter and the second size parameter include a linear distance and an angle.

12. A ranging apparatus for positioning a target object in a target space, wherein the ranging apparatus comprises:
a size parameter acquisition module including a rangefinder or a ranging wheel, the rangefinder or the ranging wheel being configured to acquire a first size parameter of the target space on a first dimension and a second size parameter of the target object on the first dimension; and
an analysis module which is constructed for determining a first layout indication according to the first size parameter, the second size parameter and a first predetermined rule, the first layout indication containing information regarding a first target position of the target object on the first dimension of the target space;
wherein the ranging apparatus is further configured to:
determine whether the target object is at the first target position in the target space; and
output a prompt signal when the ranging apparatus determines that the target object is at the first target position in the target space.

13. The ranging apparatus of claim 12, wherein the first predetermined rule includes arranging the target object at an aliquot point of the target space on the first dimension.

14. The ranging apparatus of claim 13, wherein arranging the target object at the aliquot point of the target space on the first dimension comprises at least one of:
arranging the target object at the center of the target space on the first dimension; or
arranging the target object at a m/n aliquot point of the target space on the first dimension, wherein n is a natural number greater than or equal to three, m is a natural number greater than or equal to one, m is smaller than n and m is not equal to n/2.

15. The ranging apparatus of claim 12, wherein the size parameter acquisition module comprises:
a rangefinder which is constructed for acquiring a first size parameter of the target space on a first dimension; and
a ranging wheel which is constructed for acquiring a second size parameter of the target object on the first dimension.

16. The ranging apparatus of claim 12, wherein the first dimension includes a linear direction and an arc direction, and the first size parameter and the second size parameter include a linear distance and an angle.

* * * * *